United States Patent [19]

Iseda

[11] Patent Number: 4,860,029

[45] Date of Patent: Aug. 22, 1989

[54] IMAGE INFORMATION APPARATUS

[75] Inventor: Ken Iseda, Kanagawa, Japan

[73] Assignee: Kabushiki Kaisha Toshiba, Kanagawa, Japan

[21] Appl. No.: 55,519

[22] Filed: May 29, 1987

[30] Foreign Application Priority Data

May 30, 1986 [JP] Japan .............................. 61-124929

[51] Int. Cl.[4] .............................................. G01D 15/10

[52] U.S. Cl. .............................. 346/76 PH; 346/1.1; 346/76 R; 400/648

[58] Field of Search ................. 346/76 PH, 1.1, 76 R; 358/296; 400/658, 120, 649, 648

[56] References Cited

U.S. PATENT DOCUMENTS

| | | | |
|---|---|---|---|
| 4,458,253 | 7/1984 | Goff, Jr. et al. | 341/76 PH |
| 4,531,132 | 7/1985 | Wilkinson | 346/76 PH |
| 4,562,443 | 12/1983 | Matsuno et al. | 346/76 PH |

*Primary Examiner*—E. A. Goldberg
*Assistant Examiner*—Lincoln Donovan
*Attorney, Agent, or Firm*—Foley & Lardner, Schwartz, Jeffery, Schwaab, Mack, Blumenthal & Evans

[57] ABSTRACT

An apparatus for forming an image on an image-receiving means comprises an inlet section for guiding the image-receiving section inserted along a path, a supporting section for supporting the image-receiving means inserted from the inlet section, a printing section, opposed to the supporting section through the image-receiving means, the printing section being movable between an operative position where the printing operation is achieved and an inoperative position where the image-receiving section passes smoothly through, and an adjusting section for adjusting the image-receiving means inserted from the inlet section when the printing section is moved to the inoperative position.

13 Claims, 13 Drawing Sheets

IMAGE INFORMATION APPARATUS

BACKGROUND OF THE INVENTION

1. Field of the Invention

The present invention relates to an improvement of an image forming apparatus such as a scanner printer, etc.

2. Description of the Prior Art

Conventionally, this type of image forming apparatus has a construction such as shown in FIGS. 1 and 2.

FIG. 1 shows a scanner printer. A document table (transparent glass) 2 is provided on the upper surface of a housing 1 for placing documents. On one side of document table 2, there is a positioning scale 3 which serves for positioning of a document A. Above document table 2 there is a document cover 4 whose rear edge is pivotally mounted by a shaft (not shown) permitting it to open or to close on document table 2.

An inlet 6 and an outlet 7 by which paper (image-receiving material) P may enter and leave a serial printer unit 5 that is described below are provided at the upper surface of the rear side of housing 1. A control panel 8 is provided at the upper surface of the front side of housing 1.

In housing 1, a scanner unit 9 for reading the image of a document A placed on document table 2 is provided along with serial printer unit 5 which forms images on paper P on the basis of information read by scanner unit 9. Scanner unit 9 is located below document table 2 and serial printer unit 5 is located to the rear side of scanner unit 9.

Scanner unit 9 includes a sensor unit 10 which picks up the image of document A placed on document table 2 and a drive mechanism (not shown) by which sensor unit 10 is moved reciprocally in a front to rear direction (XI direction) and to the left and right direction (YI direction).

The structure of sensor unit 10 is such that a document surface is illuminated by a spot light and the light reflected from it is led to and focussed at an image sensor, constituted by a charge coupled device (CCD), via a mirror and a lens.

Serial printer unit 5 has a construction as shown in FIG. 2. A cylindrical platen 11 supports and transports paper P. Platen 11 is driven at successive set pitches by a pulse motor 13 acting via a reduction gear train 12. In front of and facing platen 11, a thermal print head 14 as a recording head is provided. Thermal print head 14 can be moved parallel to the axis of platen 11 by a head moving means.

A shaft 15 is provided parallel to platen 11 and a carriage 16 is slidably mounted on shaft 15. Carriage 16 is connected to a timing belt 17 which is passed around between pulleys 18 and 18 that are provided near both ends of shaft 15. One of pulleys 18 can be driven by a pulse motor 20 acting via a reduction gear train 19. Carriage 16 carrying thermal print head 14 is moved reciprocally along a line parallel to the axis of platen 11 by the rotation of pulse motor 20.

Thermal print head 14 has heating elements (not shown) which are arrayed in a direction that intersects the line of the axis of platen 11 at right angles, i.e., parallel to the direction of rotation of platen 11.

A flexible cable 21 has one end fixed by a holder (not shown) to carriage 16, and a connector member 22 provided at its other end is connected to a connection element (not shown) that is located in the approximate center of the path along which carriage 16 moves. The heating elements of thermal print head 14 are connected to a head drive circuit (not shown) via the wiring pattern of the flexible cable 21.

A paper guide 23 and a paper hold-down roller (not shown) are mounted to the outer periphery portion of platen 11.

If paper P is heat-sensitive paper, images are formed by bringing the thermal print head 14 directly against it. If it is plain paper, etc., a ribbon cassette 24 is mounted at the rear side of housing 1 as shown in FIG. 1 and images are produced with a thermal transfer ink ribbon 25 interposed between paper P and thermal print head 14, as shown in FIG. 2.

However, since the arrangement in the above-described conventional apparatus provides serial printer unit 5 in housing 1, the print speed is relatively lower than that of a line printer unit. Generally, a line printer unit can print a larger number of dots in a predetermined time period than can a serial printer unit. Therefore, a serial printer unit has been recently developed to perform high speed printing by controlling the printing operation to skip blank portions. However, the above-mentioned improved serial printer unit is no match for a line printer unit.

Further, since the arrangement in the abovedescribed conventional apparatus is one in which thermal print head 14 is located in front of platen 11, ribbon cassette 24 must be mounted at the rear side of the housing 1 as shown in FIG. 1. Alternatively, it must be set in a portion of the housing 1 interior that is in front of thermal print head 14, i.e., it must be set together with a winding mechanism on carriage 16 for moving thermal head 14.

Both these arrangements hinder production of a more compact apparatus, since in the former arrangement in which ribbon cassette is mounted at the rear side of housing 1, the dimensions going towards the rear are larger when a ribbon cassette is in place, while in the latter arrangement in which the ribbon cassette is mounted on carriage 16, the depth dimension of housing 1 itself becomes large.

Furthermore, since the setting of the paper P in the above-described conventional apparatus depends on personal experience, inexperienced people sometimes cause the paper to misfeed or skew.

SUMMARY OF THE INVENTION

It is an object of the invention to provide an image forming apparatus which is constructed such that the problems mentioned above are solved, thereby making it possible to easily set a paper parallel on a platen.

It is another object of the invention to provide an image forming apparatus which makes it possible to fluently guide a paper through a path.

According to one aspect of the present invention, there is provided an apparatus for forming an image on an image-receiving means, including:

inlet means for guiding the image-receiving means inserted along a path;

supporting means for supporting the image-receiving means inserted from the inlet means;

printing means, opposed to the supporting means through the image receiving means, for printing an image on the image-receiving means, the printing means being movable between an operative position where the printing operation is achieved and an inoperative position where the image-receiving means passes smoothly through; and adjusting means for adjusting the image-receiving means inserted from the inlet means when the printing means is moved to the inoperative position.

BRIEF DESCRIPTION OF THE DRAWINGS

These and other objects and advantages of the present invention will become more apparent and more readily appreciated from the following detailed description of the presently preferred exemplary embodiments, taken in conjunction with the accompanying drawings, in which:

FIGS. 3 through 19 show an embodiment of an image forming apparatus according to the present invention, in which:

FIG. 3 is a side view, partially cut away, showing the configuration of a line printer unit;

FIG. 4 is an external perspective view;

FIG. 5 is a schematic view of the internal construction;

FIG. 6 is a plan view of a drive mechanism;

FIG. 7 is a front view, in longitudinal section, showing a sensor unit portion;

FIG. 8 is a plan view of FIG. 7;

FIG. 9 is a side view, in longitudinal section, of FIG. 7.

FIG. 10 is a plan view showing the reading width of a scanner;

FIG. 11 is a plan view for explaining the reading process;

FIG. 12 is a perspective view showing a line printer unit;

FIG. 13 is an external perspective view illustrating the case where a ribbon cassette is mounted on top of the printer unit;

FIG. 14 is a sectional side view showing the internal construction of a ribbon cassette;

FIG. 15 is a rear side view showing the relationship between a top plate and a lock mechanism;

FIG. 16 is a perspective view showing the relationship between a top plate and a lock mechanism;

FIG. 17 is a perspective view for showing the relationship between a take-up reel and a platen;

FIG. 18 is a sectional side view showing a ribbon cassette when it is mounted in the operating place; and FIG. 19 is a block diagram showing the configuration of main elements in a control circuit;

FIGS. 20 through 22 show another embodiment of an image-forming apparatus according to the present invention, in which:

FIG. 20 is a side view, partially cut away, showing the configuration of the serial printer unit in case the paper path is opening;

FIG. 21 is a side view, partially cut away, showing the configuration of the serial printer unit in case the printer unit is printing or waiting; and FIG. 22 is a schematic view of the internal construction.

DETAILED DESCRIPTION OF THE PREFERRED EMBODIMENTS

An embodiment of the present invention will now be described with reference to FIG. 3 through FIG. 19.

Figure 1:
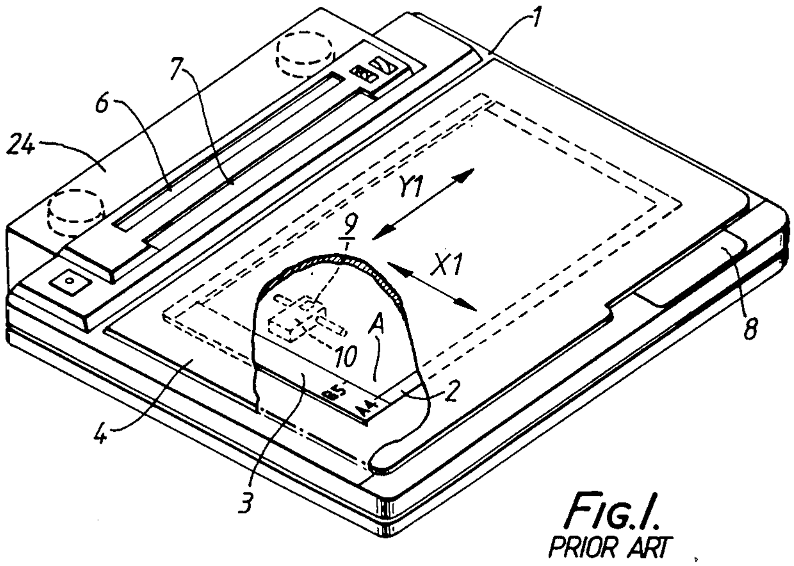
FIG. 1. PRIOR ART
FIG. 1 is an external perspective view, partially cut away s . a conventional apparatus.
Figure 2:
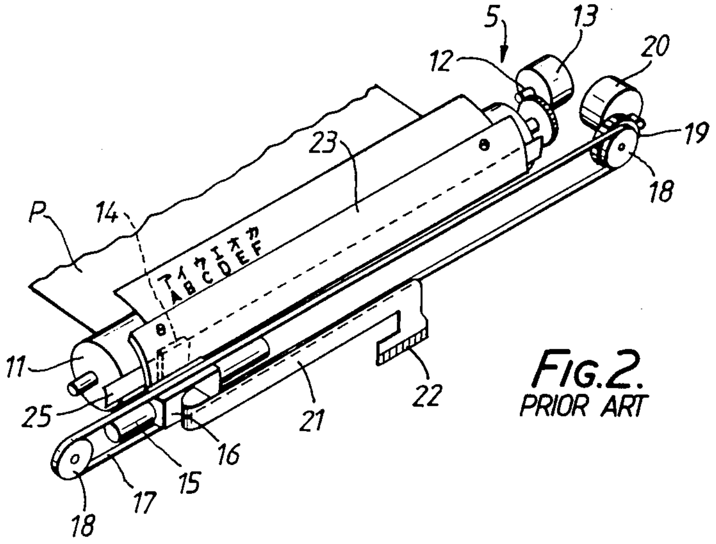
FIG. 2. PRIOR ART
FIG. 2 is a schematic perspective view of the serial printer unit in this conventional apparatus.
Figure 3:
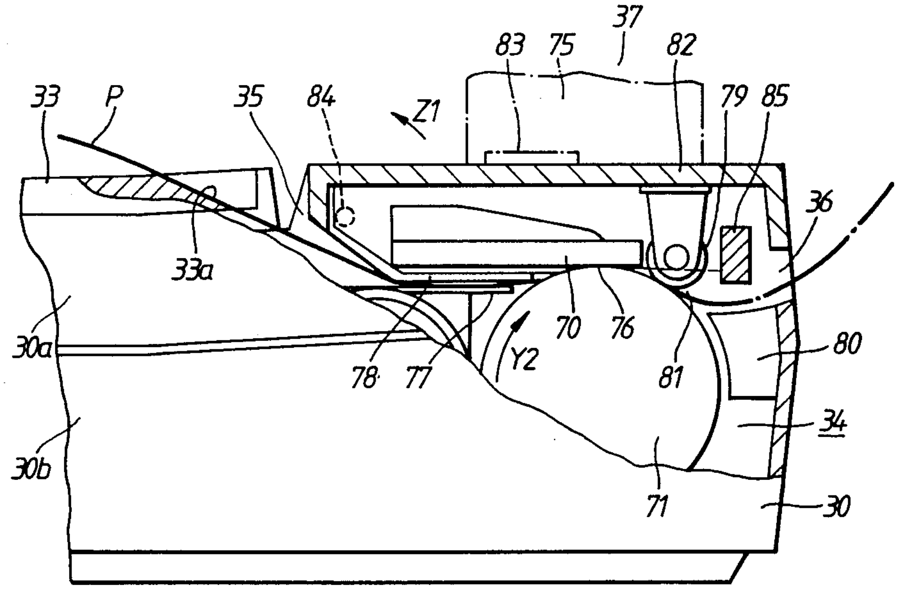
Figure 4:
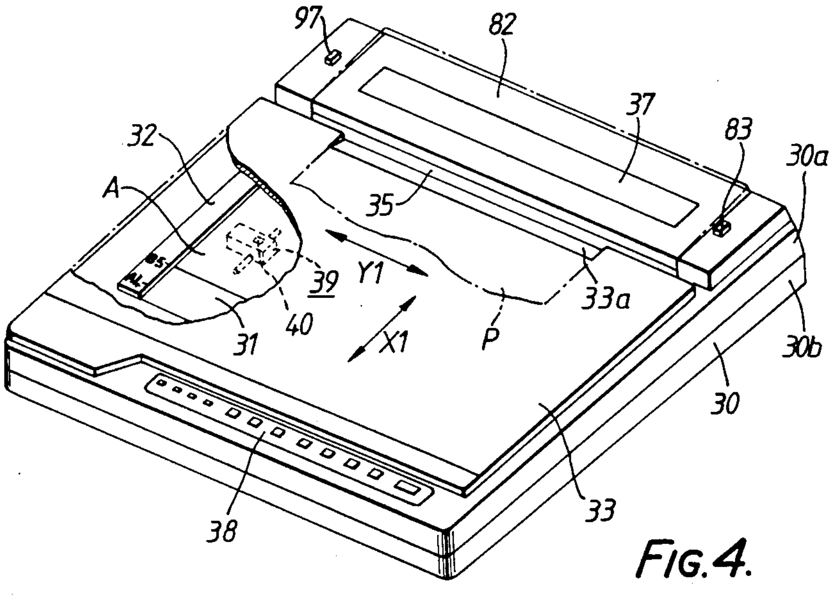

FIG. 3 shows the main structural parts of a scanner printer and FIG. 4 is an external view, partially cut away, of the printer. A housing 30 is formed in a flat box-like shape and has an upper wall 30*a* and bottom wall 30*b*. A document table (transparent glass) 31 is provided on the upper surface of the upper wall of housing 30 for placing documents thereon. On one side of document table 31 there is a positioning scale 32 which serves for positioning a document A. Above document table 31 there is a document cover 33 whose rear edge is pivotally mounted by a shaft (not shown), permitting it to open or to close on document table 31.

An inlet 35 and an outlet 36 by which paper (image-receiving material) P may enter and leave a line printer unit 34 that is described below are respectively provided at the rear side of the housing 30 upper surface and in the rear surface of housing 30. A ribbon cassette loading stage 37 is provided at the rear side of inlet 35. A control panel 38 comprising a print switch, stop switch, paper feed switch and copying range specifying switch, etc. is provided at the front edge of the housing 30 upper surface. At the rear side of document cover 33, there is a taper portion 33*a* which is for guiding insertion of paper P and allows copy paper P to be guided smoothly to inlet 35 of line printer unit 34. The sides of taper portion 33*a* constitute transverse guides for insertion of paper P.

A scanner unit (image reading means) 39 which reads the image of a document A placed on document table 31, and line printer unit 34 which forms an image on paper P on the basis of information read by scanner unit 39, are provided inside housing 30. Scanner unit 39 is located below document table 31 and line printer unit 34 is located to the rear of scanner unit 39.

Figure 5:
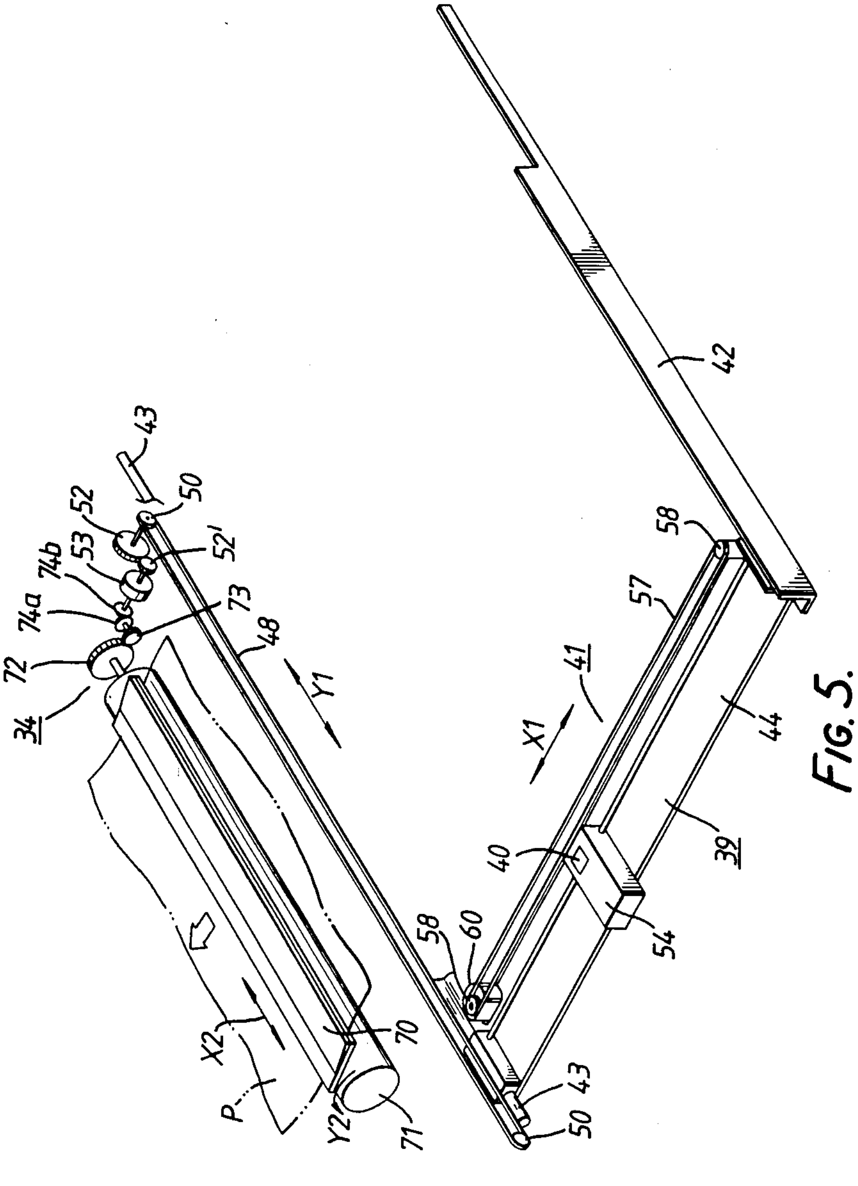

As shown in FIG. 5, scanner unit 39 has a sensor unit 40 which picks up the image of a document on document table 31 and a drive mechanism 41 which causes reciprocal movement of sensor unit 40 in the X1 direction (first direction), going from front to rear, and in the Y1 direction (second direction), going from left to right.

Figure 6:
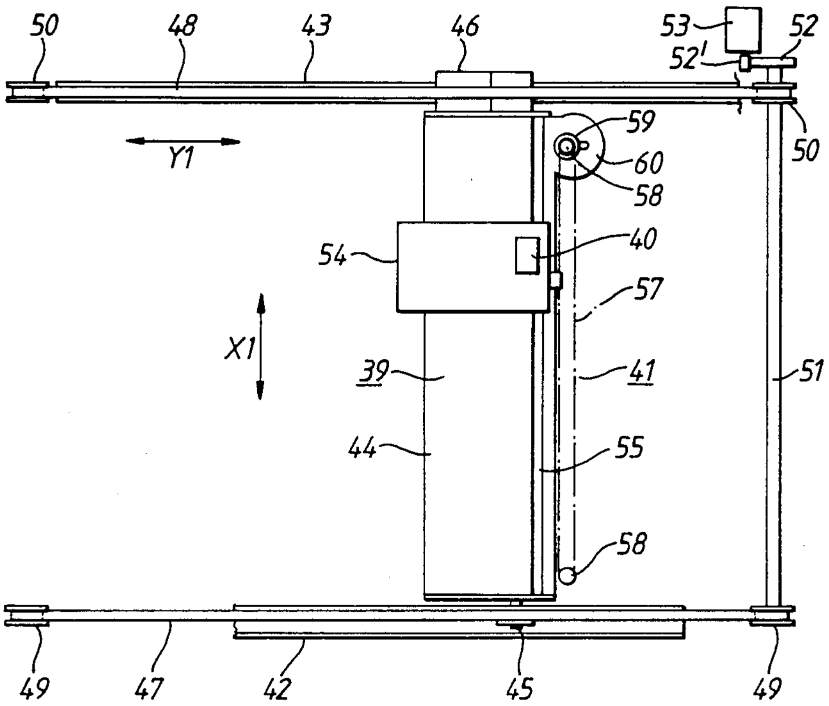

Scanner unit 39 is constructed in the manner shown in FIGS. 5 and 6. That is, a guide rail 42 going in the Y1 direction is provided along the front side of scanner unit 39 inside housing 30 and a guide shaft 43, also going in the Yl direction, is provided along its rear side. A first carriage 44 straddles the space between guide rail 42 and guide shaft 43. The front edge of first carriage 44 is movable on guide rail 42 via a roller 45, and its rear edge is slidably supported on guide shaft 43 by a slider 46, first carriage 44 thus being freely movable in the Y1 direction. The front edge and rear edge of first carriage 44 are respectively connected to timing belts 47 and 48 which respectively pass around between a pair of pulleys 49 and 49 provided near both ends of guide rail 42 and a pair of pulleys 50 and 50 provided near both ends of guide shaft 43. Pulleys 49 and 50 at one end are mounted on both ends of a shaft 51 which is driven by a first pulse motor 53 acting via a train of reduction gears 52 and 52'. Thus, driving the first pulse motor 53 causes first carriage 44 to move reciprocally in the Y1 direction.

A second carriage 54 is supported on first carriage 44. As shown in FIG. 6, second carriage 54 has its right-hand side slidably supported on a shaft 55 that is provided going in the X1 direction on first carriage 44, and its left-hand side is slidably supported on the edge of first carriage 44 via an engagement recess portion 56 (FIGS. 7 and 9), whereby it can move freely in the X1 direction. The right-hand side of second carriage 54 is connected to a timing belt 57 that passes around between pulleys 58 and 58 which are located at the front and rear sides of first carriage 44, and one of which is driven by a second pulse motor 60 acting via a reduction gear train 59. Thus, drive of second pulse motor 60 causes second carriage 54 to move reciprocally in the X1 direction.

Figure 7:
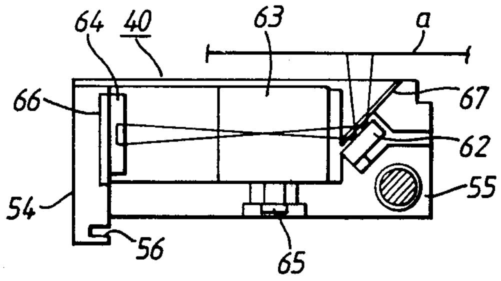
Figure 8:
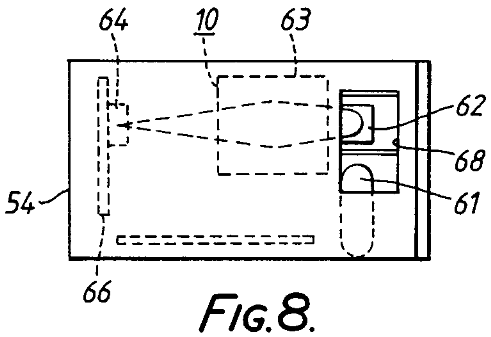
Figure 9:
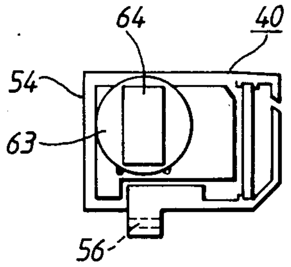

Sensor unit 40 is mounted on second carriage 54 and, as shown in FIGS. 7 through 9, has a construction in which a document surface A is illuminated by a spot light source 61, and light reflected from this surface goes successively via a mirror 62 and a lens 63 to be led to and focussed at an image sensor 64 constituted by a charge coupled device (CCD). A screw 65 is operatively provided to lens 63 for adjusting the focus of lens 63. When screw 65 is turned, it causes lens 63 to move along the optical axis. Image sensor 64 is mounted directly on a circuit board 66 so as to minimize noise effects. Mirror 62 is held by a holder 67. Above mirror 62, a window 68 is provided to permit the passing of light from document surface A.

Figure 10:
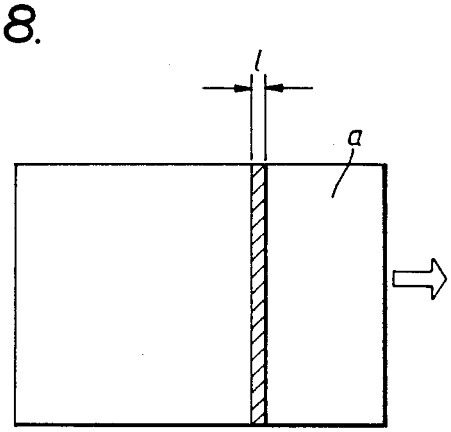

Image sensor 64 comprises a plurality (8 bits) of sensor elements. First carriage 44 carrying image sensor 64 is moved in the X1 direction by drive mechanism 41. As a result, a document image is read on a line-by-line basis, each line being the width of image sensor 64 bits, as shown in FIG. 10.

Figure 11:
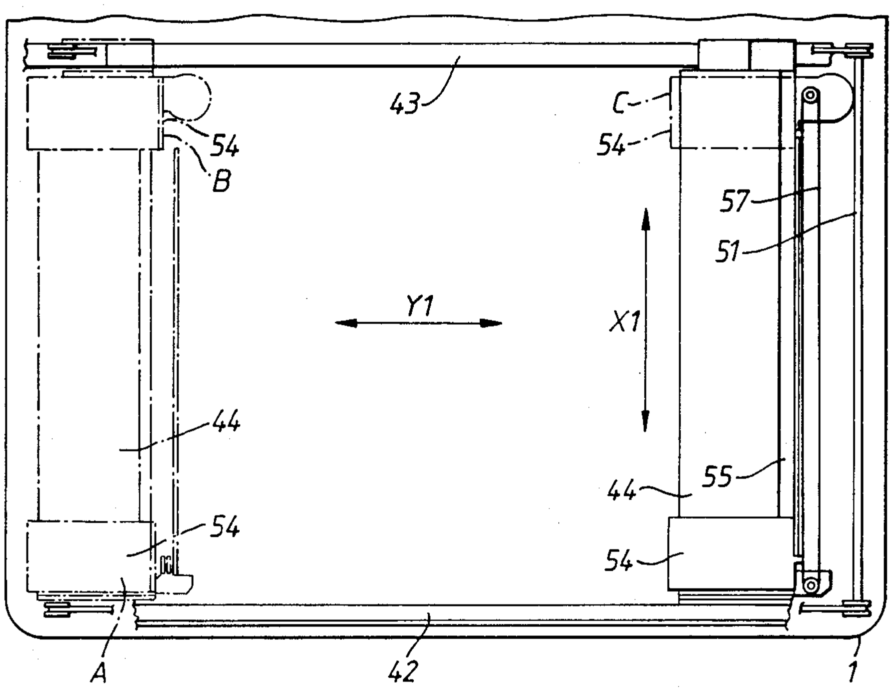

As shown in FIG. 11, reading starts at a front left position A and is effected going in the X1 direction up to a rear position B. On completion of this reading there is a return to the front side, and during this return movement, sensor unit 40 is shifted a line reading width to the right. Repetition of this action results in reading being effected up to a rear right position C.

Figure 12:
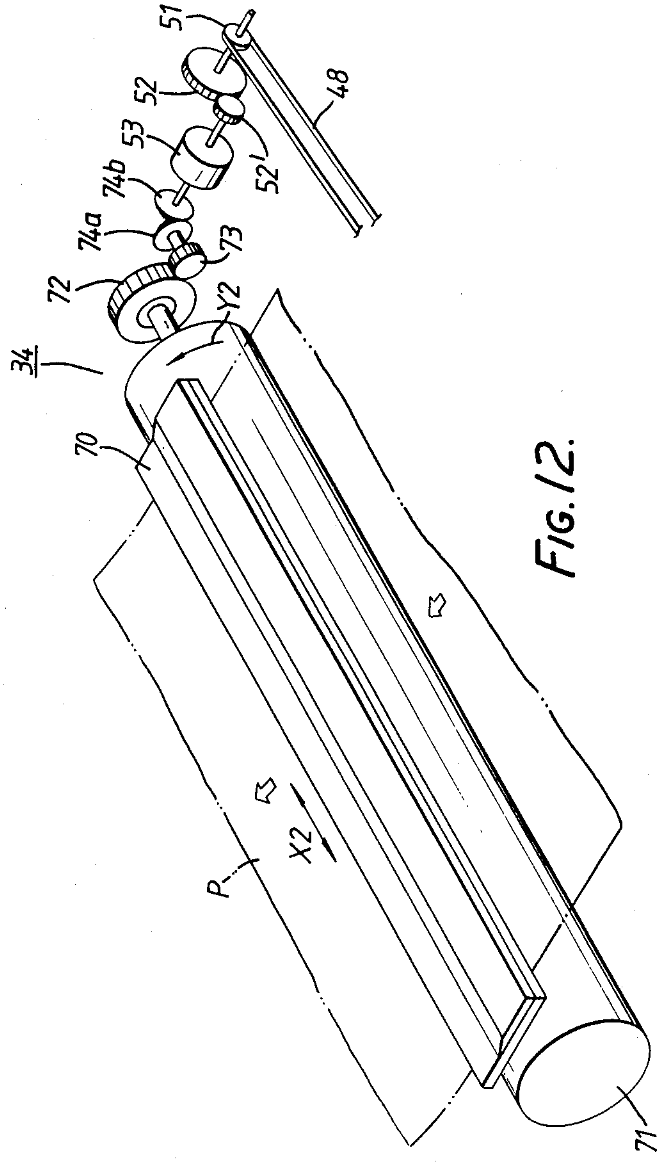
Figure 13:
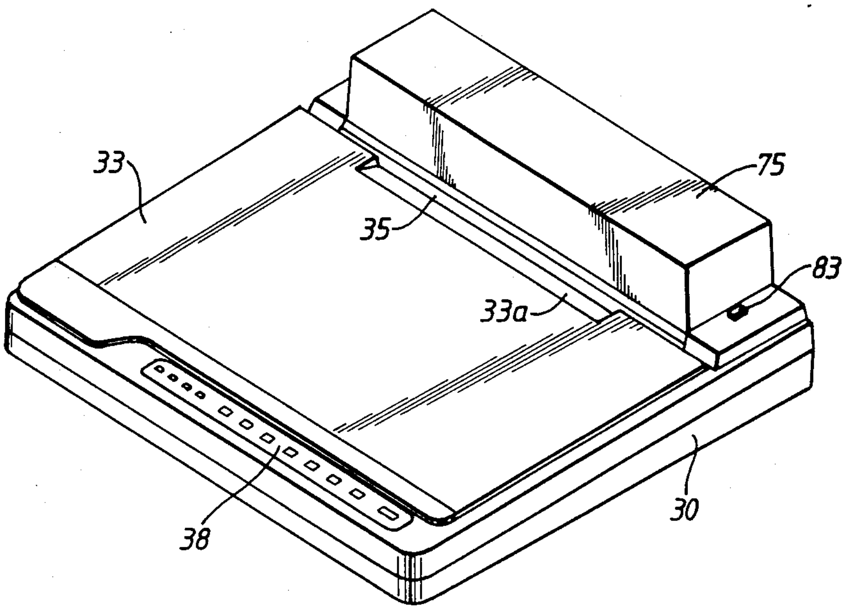

As shown in FIGS. 3, 5 and 12, line printer unit 34 is constituted by a recording head in the form of a line-shaped thermal print head 70 and a cylindrical platen 71.

Paper P is supported and transported by platen 71. Platen 71 is driven in the direction Y2 with one set pitch at a time, simultaneously with the drive of scanner unit 39 in the Y1 direction, by first pulse motor 53 acting via a train of gears 72 and 73 and a pair of bevel gears **74*a* and 74*b*. Line-shaped thermal print head 70 (recording head) extends over the entire width of platen 71 and is disposed facing downwards and facing the upper surface of platen 71**.

Thermal print head 70 has a line of heating elements (not shown) which are disposed parallel to the axis of platen 71, i.e., in a direction that is perpendicular to the direction Y2 of rotation of platen 71. Printing is effected following on from and at the same speed as reading by scanner unit 39. At a peripheral portion of platen 71, there are paper guides 77 and 78 by which paper P is guided from paper inlet 35 to an image forming station 76 between platen 71 and thermal print head 70. At a location that is further on than image forming station 76 in the direction of paper transport, there is a paper press-down roller 79 which presses paper P against platen 71. At the downstream of paper press-down roller 79 in the direction of paper transport, there is a paper guide 80 which guides paper P to paper outlet 36. These elements together define a transport path 81 going from paper inlet 35 to paper outlet 36.

On depression of a push button 83 in a rear right-hand edge portion of the upper surface of housing 30, spring or similar force causes a top plate 82 that constitutes the top surface of line printer unit 34 to pivot about a pivot point 84 at paper inlet 35 at the end of top plate 82 and to be pivotally displaced counterclockwise as shown in FIG. 3 (in the direction of arrow Zl). As a result, upper paper guide 78, thermal print head 70 and paper press-down roller 79 are moved upwards integrally with top plate 82, so opening paper transport path 81 and permitting paper P that has been inserted via paper inlet 35 to be passed smoothly through image forming station 76. The leading edge of paper P is positioned by coming against a stopper 85 located to the rear of paper press-down roller 79, further insertion being prevented when it contacts this stopper 85.

Figure 18:
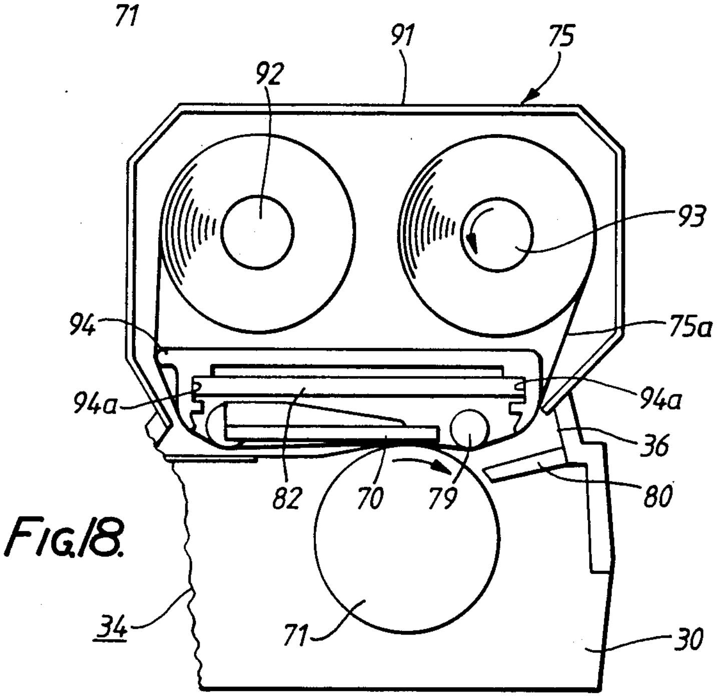

In setting paper P in place, its side edges are positioned by the sides of taper portion 33a of document cover 33 and paper P is easily set parallel to platen 71 by simply being inserted, with the positions of its side edges thus controlled, until it comes against stopper 85. If paper P is heat-sensitive paper, images are formed by bringing thermal print head 70 to face paper P directly, without mounting a ribbon cassette 75. If paper P is plain paper, etc., to form images, ribbon cassette 75 is mounted beforehand in the upper portion of line printer unit 34 and a thermal transfer ink ribbon **75*a* is brought between paper P and thermal print head 70, as shown in FIG. 18**.

Figure 20:
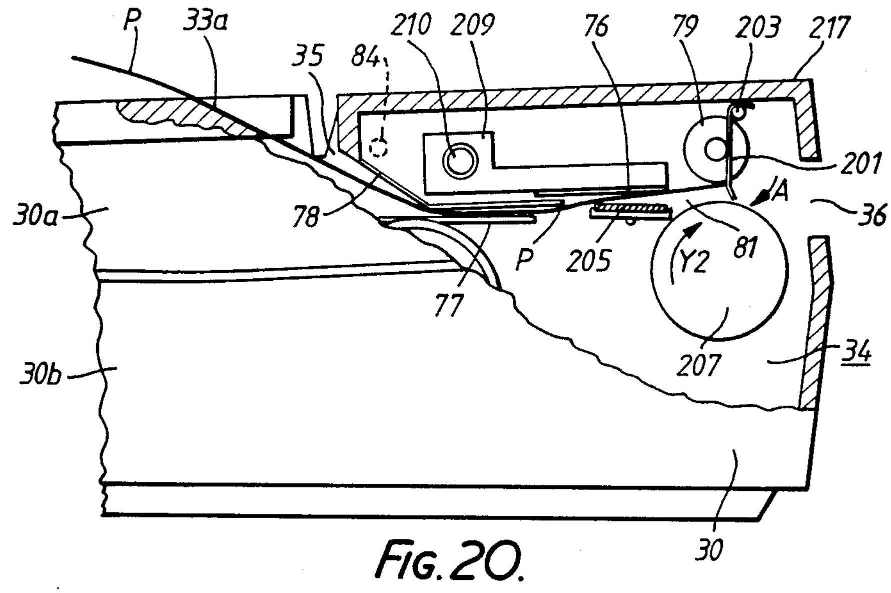
Figure 21:
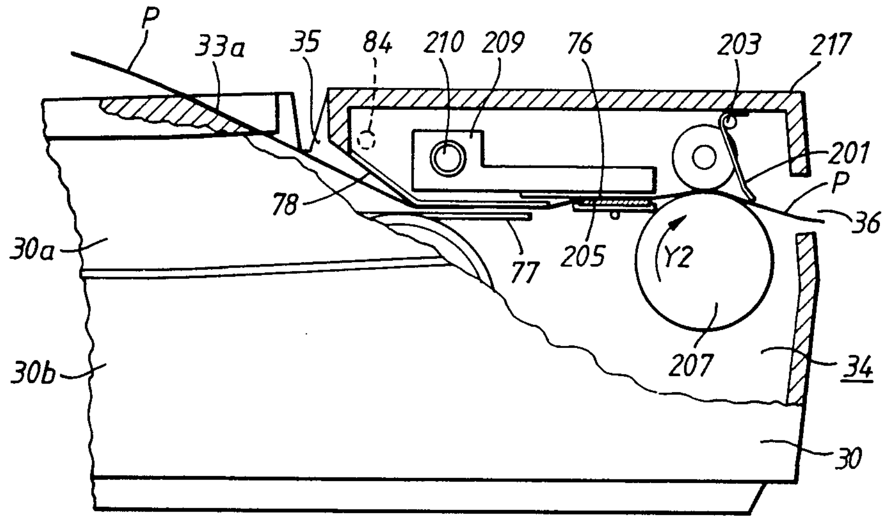
Figure 22:
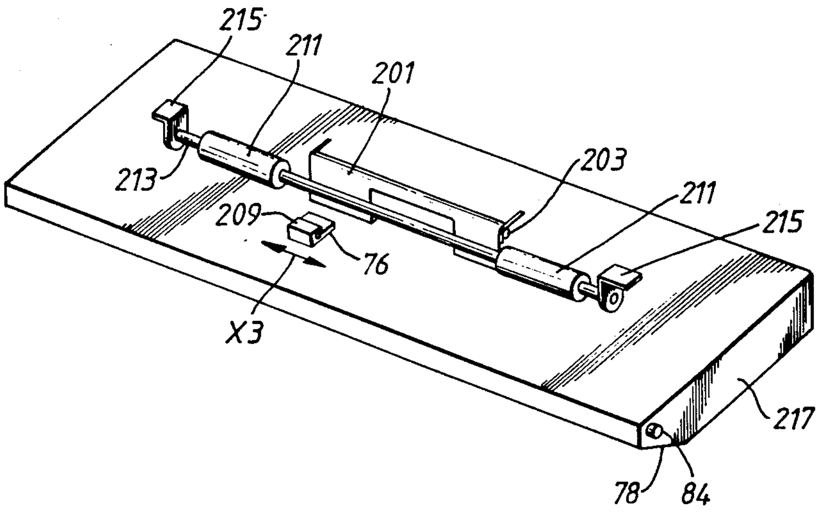

Another embodiment of this line printer unit 34 is shown in FIGS. 20, 21, and 22. In these figures, the sample parts are shown with the same numbers. As shown in FIGS. 20, 21, 22, in this embodiment, the leading edge of paper P is positioned by a plate-type stopper 201. This stopper 201 is a plastic plate or metal plate. Against the paper press-down roller 79, there is a feeding roller 207 instead of platen 71 which is shown in FIG. 3, and against thermal print head 209, there is a flat platen 205. Thermal print head 209 is a serial head different from thermal print head 70 which is shown in FIG. 3. This thermal print head 209 is moved by driving means (not shown) in the direction of X3 as shown in FIG. 22. Feeding roller 207 is driven by a pulse motor (not shown) similar to that shown in FIG. 5. Thermal print head 209 has a shaft 210. Thermal print head 209 moves in the direction X3 through the shaft 210, as shown in FIG. 22.

At the edge of paper press-down roller 79, there are fitting materials 215, 215 at both sides. These fitting materials 215, 215 are set at a thermal head holder 217 similar to that of top plate 82 as shown in FIG. 3. As a result, upper paper guide 78, thermal print head 209 and paper press-down roller 79 are moved upwards integrally with the thermal head holder 217, so opening paper transport path 81 and permitting paper P that has been inserted via paper inlet 35 to be passed smoothly through image forming station 76 of thermal print head 209. The leading edge of paper P is positioned by coming against a stopper 201. Stopper 201 is located to the rear of paper press-down roller 79, and upward of feeding roller 207. This stopper 201 is pressed in the direction of arrow A by a coil spring (spring means) 203. Then, further insertion is prevented when paper P contacts this stopper 201. In setting paper P in place, its side edges are positioned by the sides of taper portion **33*a* of document cover 33, and paper P is easily set parallel to platen 207 by simply being inserted, with the position of its side edges thus controlled, until it comes against stopper 201**.

Figure 14:
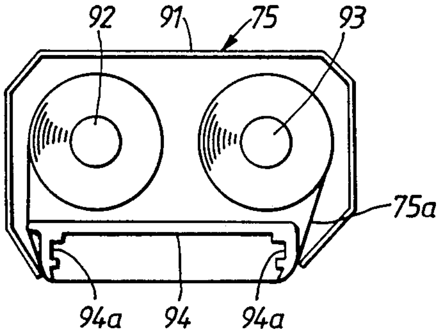

As shown in FIG. 14, ribbon cassette 75 has a feed-out reel 92, a take-up reel 93 and a guide hub 94 in a cassette housing 91. Guide hub 94 guides thermal transfer ink ribbon 75a in a manner such that an intermediate part thereof is exposed at the lower surface of cassette housing 91. The width of thermal transfer ink ribbon 75a is approximately equal to the length of thermal print head 70. Guide hub 94 has guide grooves 94a for guiding it along top plate 82.

Figure 15:
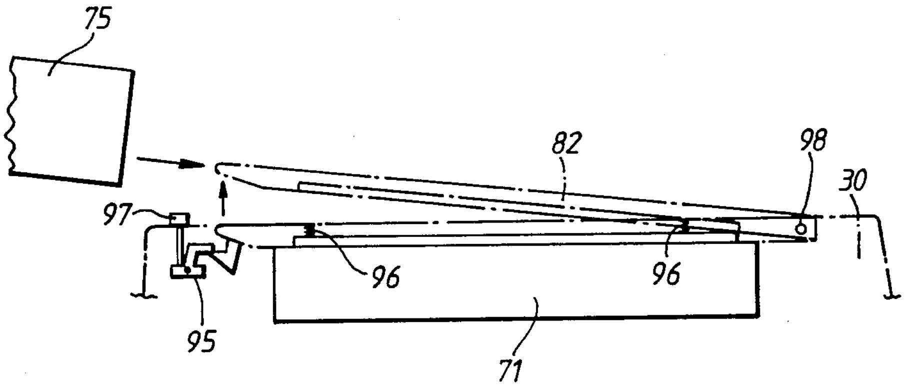
Figure 16:
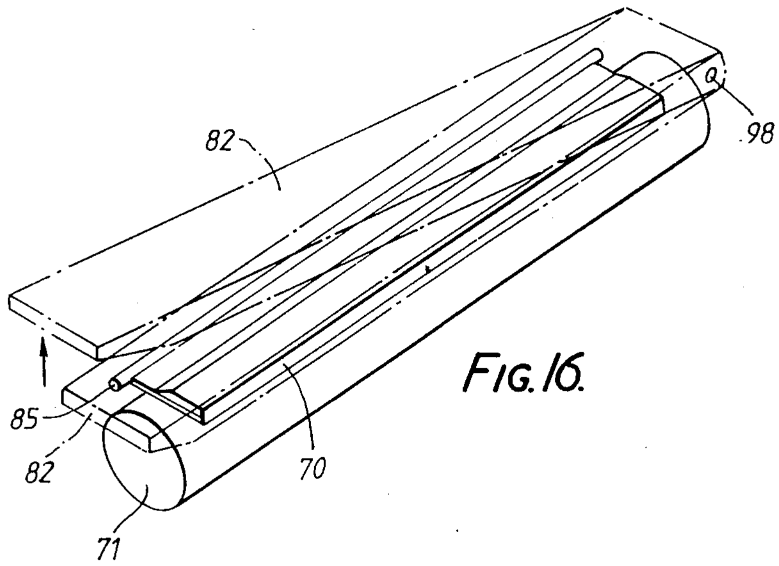

As shown in FIGS. 15 and 16, depression of a push button 97 provided in a rear left-hand portion of the upper surface of housing 30 releases locking by a lock mechanism 95, whereupon top plate 82 is pivoted open about a pivot point 98 by the resilient force of a spring 96. As a result, upper paper guide 78, thermal print head 70 and paper press-down roller 79 are moved upwards integrally with top plate 82. When this is done, guide grooves 94a provided in guide hub 94 of ribbon cassette 75 are engaged by being pushed in along top plate 82, as shown in FIG. 17, and further downward pushing results in ribbon cassette 75 being mounted on top of printer unit 43, as shown in FIG. 18.

Figure 17:
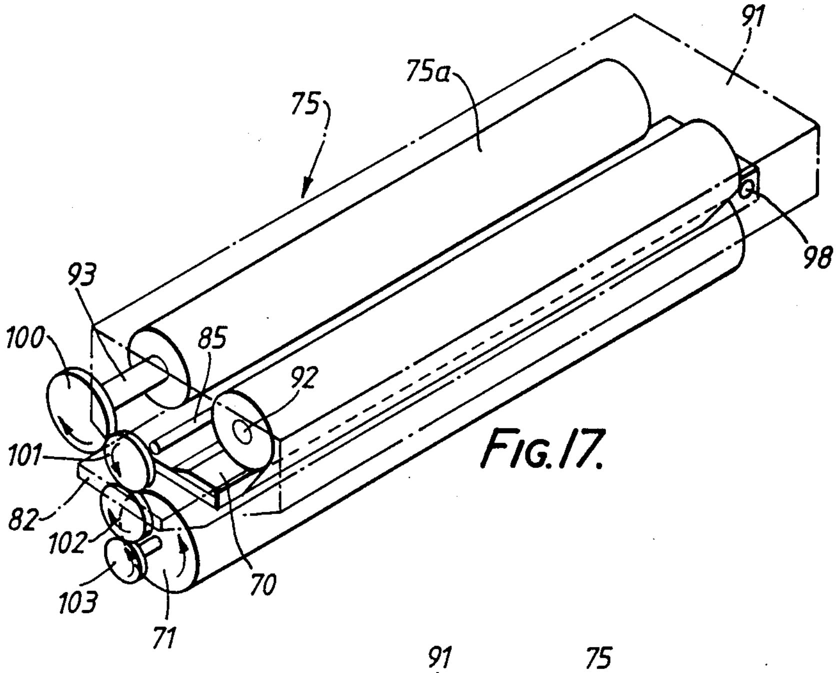

As shown in FIG. 17, a gear 100 axially supported by take-up reel 93 is connected via gears 101 and 102 to a gear 103 axially supported by platen 71, whereby rotation of platen 71 is accompanied by rotation of take-up reel 93, and hence movement of thermal transfer ink ribbon 75a.

Figure 19:
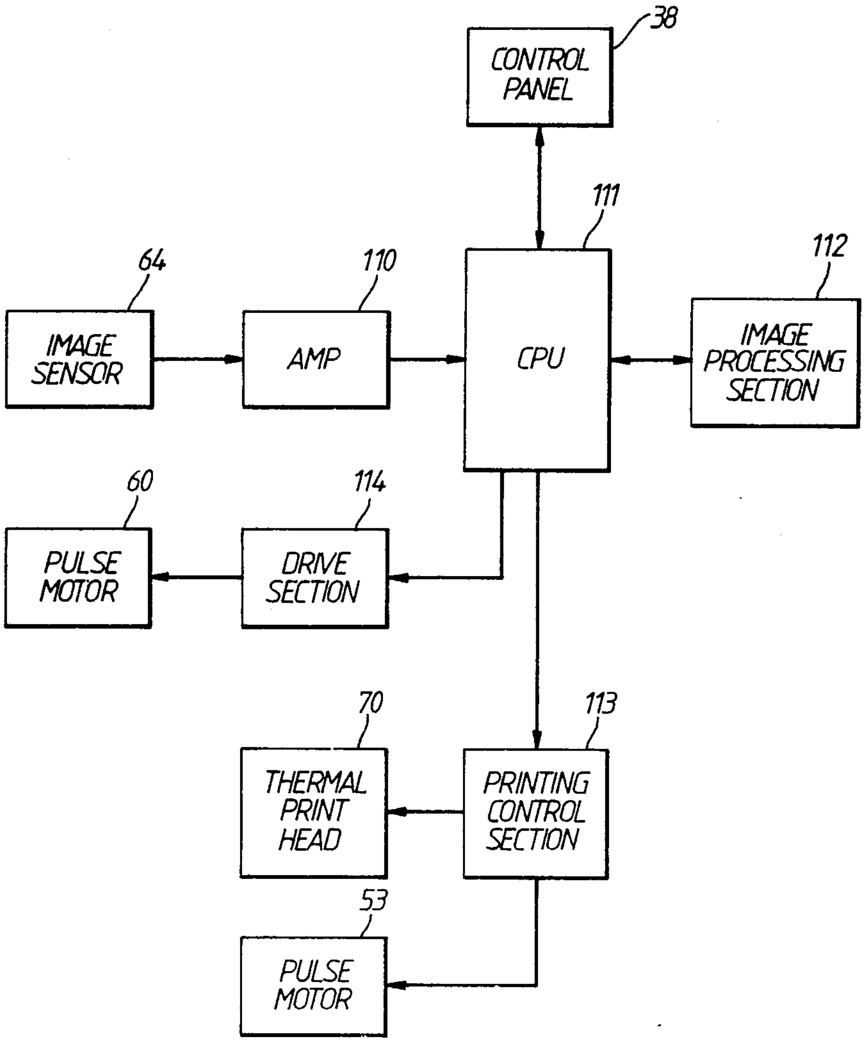

The control circuit will now be described with reference to FIG. 19. Image information output from image sensor 64 is supplied via an amplifier 110 to a CPU 111. CPU 111 effects overall control and stores the image information supplied from image sensor 64 in an image processing section 112. Image processing section 112 is a buffer memory for temporary storage of several lines of image information that has been processed by image sensor 64. When image information is stored in image processing section 112, CPU 111 reads it out one line at a time and outputs it to a printing control section 113. Printing control section 113 drives thermal print head 70 in accordance with each line of signals with which it is supplied and, while doing this, effects one line drive of pulse motor 53, which effects simultaneous displacement of sensor unit 40 (in the Y1 direction). CPU 111 also effects control of a drive section 114 which drives pulse motor 60.

The various sections noted above are actuated by a power supply (not shown) constituted by cells or batteries, etc.

The operation of the above structure will now be described. First, a description will be given with reference to the case where paper P is heat sensitive paper. The operator places a document A on document table 31, puts document cover 33 over it and then presses push button 83. Hereupon, one side of top plate 82 rises as shown in FIG. 4, this being accompanied by integral upward displacement of upper paper guide 78, thermal print head 70 and paper press-down roller 79. Next, the operator, making use of taper portion 33a of document cover 33, inserts paper P until it comes against stopper 85.

Next, the operator pushes the top plate 82 down and actuates a print switch (not shown) on control panel 38. Hereupon, CPU 111 drives pulse motor 60 in the forward direction, so causing sensor unit 40 to move from point A (see FIG. 11) and travel in the X1 direction. Light from spot light source 61 illuminates document A and light reflected from document A is led successively via mirror 62 and lens 63 and illuminates image sensor 64. Whereby an image corresponding to document A is projected onto image sensor 64. Image sensor 64 converts this image to electrical signals and outputs these signals in bit units via amplifier 110 to CPU 111, so resulting in storage of these signals in image processing section 112 by CPU 111.

When illumination has been effected up to point B, CPU 111 stops pulse motor 60, so stopping sensor unit 40. Next, image information corresponding to 8 scanning lenses has been stored in image processing section 112. Then, CPU 111 reads this information out line-by-line and outputs it to printing control section 113, which in response drives thermal print head 70 in accordance with each line of signals with which it is supplied. As it also drives pulse motor 53, platen 71 is rotated in the Y2 direction an amount corresponding to one line, and sensor unit 40 is moved the equivalent of one line in the Y1 direction. When transfer of information corresponding to 8 scanning lines has been completed, image sensor 40 is again moved in the X1 direction from point A and reads the document. As a result, heating is effected in correspondence to thermal print head 70 drive, so effective formation of the image of document A onto paper P.

Next, the case where paper P is plain paper will be described. The operator presses push button 97. This releases locking by lock mechanism 95 and so top plate 82 opens in the manner shown in FIG. 16. As a result, upper paper guide 78, thermal print head 70 and paper press-down roller 79 are moved upwards integrally with top plate 82. Next, the operator engages guide grooves 94a provided in guide hub 94 of ribbon cassette 75 by pushing them along top plate 82 in the manner shown in FIG. 15 and then pushes ribbon cassette 75 down and causes top plate 82 and ribbon cassette 75 to be locked in place by lock mechanism 95. As a result, ribbon cassette 75 is mounted on top of line printer unit 34 and running the length of thermal print head 70 is covered with the width of thermal transfer ink ribbon 75a as shown in FIGS. 17 and 18.

Next, the operator places a document A on document table 31, puts document cover 33 over it and then presses push button 83. Hereupon, one side of top plate 82 rises together with ribbon cassette 75, this being accompanied by integral upward displacement of upper paper guide 78, thermal print head 70 and paper press-down roller 79. Next, the operator, making use of taper portion 33a of document cover 33, inserts paper P until it comes against stopper 85.

Next, the operator pushes top plate 82 (or ribbon cassette 75) down and actuates a print switch (not shown) on control panel 38. Subsequent operation is similar to that in image formation onto heat sensitive paper and an image corresponding to document A is transferred onto paper P as the result of transfer in correspondence to thermal print head 70 drive and using thermal transfer ink ribbon 75a.

As described above, a duplicate copy of a document is produced on copy paper by installing a line-shaped thermal print head facing the upper surface of a platen, reading the image of the document by causing a sensor unit which picks up the image by illuminating the document on a document table by means of a spot light source and picking up light radiated from the document to move in a front to rear direction (XI direction) and in a left to right direction (YI direction) and driving the thermal print head in accordance with read information. The apparatus is designed for reduction of the number of parts, since left to right (YI direction) movement of the sensor unit and rotation of the platen are effected by drive from a single motor. Also, the apparatus is designed for simplified control, since the apparatus has at least a line-shaped thermal print head and a buffer memory able to store one line of recording data, one line of data is read out at the sensor unit and during transfer effected by the line-shaped thermal print head in correspondence to the read data, the sensor unit is moved the equivalent of one line in the Y1 direction.

Although description of the above embodiment was given with reference to the case where a take-up reel in a ribbon cassette is driven in correspondence to rotation of a platen, the apparatus is not limited to this; it is also possible to provide the ribbon cassette with a drive means that effects drive by batteries, and to use this drive means to rotate the take-up reel. Also, the arrangement may be one in which the drive power of the motor for driving the platen rotates the take-up reel by being transmitted to it by gears, etc.

Further, the thermal transfer ink ribbon in the ribbon cassette may be an ink ribbon in which Y (yellow), M (magenta) and C (cyan) or Y (yellow), M (magenta), C (cyan) and B (black) inks are successively disposed in the direction of lines. In these cases, color ink transfer can be effected.

What is claimed is:

1. An apparatus for forming an image on an image-receiving means, comprising:

(a) inlet means for guiding an image-receiving means inserted in said inlet means along a transport path for transporting said image-receiving means;

(b) supporting means for supporting said image-receiving means, inserted from said inlet means;

(c) printing means, opposed to said supporting means, for printing an image on said image-receiving means, said printing means being movable between an operative position where the printing operation is achieved and an inoperative position where said image-receiving means passes smoothly through said path; and (d) adjusting means, including a plate to stop a leading edge of said image-receiving means, for adjusting said image-receiving means inserted in said inlet means where said printing means is moved to said inoperative position and for guiding said image-receiving means when said printing means is moved to said operative position.

2. An image forming apparatus according to claim 1, wherein said adjusting means includes a spring means which presses said plate to stop the leading edge of the image-receiving means.

3. An image forming apparatus according to claim 1, wherein said supporting means includes a cylindrical roller for supporting said image-receiving means.

4. A image forming apparatus according to claim 3, wherein said image-receiving means is pressed against said cylindrical roller by said adjusting means.

5. An image forming apparatus according to claim 1, wherein said supporting means includes a feeding roller for feeding the image-receiving means along said transport path.

6. An image forming apparatus according to claim 1, wherein said printing means is held by a holding means for holding the printing means.

7. An image forming apparatus according to claim 6, wherein said holding means holds said adjusting means.

8. An image forming apparatus according to claim 1, wherein said supporting means includes a cylindrical platen facing said printing means.

9. An image forming apparatus according to claim 1, wherein said supporting means includes a flat platen which has a flat surface facing said printing means.

10. An apparatus as claimed in claim 1, wherein said adjusting means stops and positions the leading edge of said image-receiving means prior to a print operation.

11. An apparatus for forming an image on an image receiving means, comprising:

(a) inlet means for guiding an image-receiving means inserted in said inlet means along a transport path for transporting said image-receiving means;

(b) supporting means for supporting said image-receiving means, inserted from said inlet means;

(c) printing means, opposed to said supporting means for printing an image on said image-receiving means, said printing means being movable between an operative position where the printing operation is achieved and an inoperative position where said image-receiving means passes smoothly through said path;

(d) adjusting means for adjusting said image-receiving means inserted in said inlet means when said printing means is moved to said inoperative position and for guiding said image-receiving means when said printing means is moved to said operative position; and (e) guiding means, opposed to said adjusting means, for guiding said image-receiving means cooperate to said adjusting means when said printing means is moved to said operative position.

12. An apparatus as claimed in claim 10, wherein said adjusting means stops and positions the leading edge of said image-receiving means prior to a print operation.

13. An apparatus for forming an image on an image-receiving means, said apparatus comprising:

(a) a housing having an image-receiving element inlet and an image-receiving element outlet;

(b) a image-receiving element support mounted within said housing and positioned to receive and support an image-receiving element from said image-receiving element inlet along a transport path; and (c) a printing unit coupled to said housing and opposed to said image-receiving element support, said printing unit being movable between a first operative position and a second inoperative position, said printing unit including a stop element that stops and positions the leading edge of said image-receiving element along said transport path when said printing unit is in said second inoperative position and a pressure element that presses said image-receiving element into contact with said image-receiving element support when said printing unit is in said first operative position.

* * * * *